(12) United States Patent
Costa

(10) Patent No.: US 8,389,425 B2
(45) Date of Patent: Mar. 5, 2013

(54) BONDED MAT AND METHOD FOR MAKING

(75) Inventor: Nelson R. Costa, Sao Paulo (BR)

(73) Assignee: 3M Innovative Properties Company, St. Paul, MN (US)

( * ) Notice: Subject to any disclaimer, the term of this patent is extended or adjusted under 35 U.S.C. 154(b) by 456 days.

(21) Appl. No.: 12/696,798

(22) Filed: Jan. 29, 2010

(65) Prior Publication Data

US 2011/0189467 A1    Aug. 4, 2011

(51) Int. Cl.
| | |
|---|---|
| *D04H 1/00* | (2006.01) |
| *D04H 3/00* | (2012.01) |
| *D04H 5/00* | (2012.01) |
| *D04H 13/00* | (2006.01) |
| *D04H 1/56* | (2006.01) |
| *B32B 27/12* | (2006.01) |
| *D02G 3/00* | (2006.01) |
| *F16J 15/20* | (2006.01) |

(52) U.S. Cl. ........ 442/334; 442/336; 442/337; 442/394; 442/400; 428/365; 428/372

(58) Field of Classification Search ............... 428/313.3, 428/313.5, 365, 372; 442/327, 334, 336, 442/337, 394, 400
See application file for complete search history.

(56) References Cited

U.S. PATENT DOCUMENTS

| | | | |
|---|---|---|---|
| 3,100,926 A * | 8/1963 | Richmond | 156/148 |
| 3,686,049 A | 8/1972 | Manner et al. | |
| 3,837,988 A | 9/1974 | Hennen et al. | |
| 4,351,683 A | 9/1982 | Kusilek | |
| 4,634,485 A | 1/1987 | Welygan et al. | |
| 4,879,163 A * | 11/1989 | Woiceshyn | 428/198 |
| 5,866,253 A | 2/1999 | Philipps et al. | |
| 5,951,507 A | 9/1999 | Hilston et al. | |
| 5,972,166 A | 10/1999 | Helwig | |
| 6,013,347 A | 1/2000 | Martin | |
| 6,080,482 A | 6/2000 | Martin et al. | |
| 6,534,146 B1 | 3/2003 | Mentz, Jr. | |
| 6,797,371 B1 * | 9/2004 | Gehlsen et al. | 428/313.3 |
| 6,871,898 B2 * | 3/2005 | Jarrard et al. | 296/107.01 |
| 7,189,784 B2 | 3/2007 | Barber | |
| 2002/0062912 A1 | 5/2002 | Mitra et al. | |
| 2002/0071947 A1 * | 6/2002 | Soane et al. | 428/313.3 |
| 2006/0035550 A1 | 2/2006 | Aseere | |
| 2006/0177626 A1 | 8/2006 | Johnson et al. | |
| 2007/0141335 A1 | 6/2007 | Perera et al. | |
| 2007/0208093 A1 | 9/2007 | Nordin et al. | |

FOREIGN PATENT DOCUMENTS

| | | |
|---|---|---|
| WO | WO 98/23800 | 6/1998 |
| WO | WO 00/41850 | 7/2000 |
| WO | WO 2004/045362 | 6/2004 |

OTHER PUBLICATIONS

International Search Report, PCT/US2011/022657, mailed Oct. 10, 2011, 4 pages.

* cited by examiner

*Primary Examiner* — Elizabeth Cole
*Assistant Examiner* — Jeremy R Pierce
(74) *Attorney, Agent, or Firm* — Kenneth B. Wood

(57) ABSTRACT

Herein is disclosed a bonded mat comprising a coil web that is bonded to a backing. The coil web comprises continuous coiled fibers, at least some of which contain expanded polymeric microspheres. The backing comprises a porous material. Methods of making the coil web and the backing, and methods of bonding the coil web and the backing, are disclosed.

15 Claims, 2 Drawing Sheets

BONDED MAT AND METHOD FOR MAKING

BACKGROUND

For many years, mats comprised of thermoplastic polymeric materials have found use as floor coverings. In particular, mats comprising a water-impermeable backing with coiled coarse filaments protruding upward therefrom, have been used as floormats which can dislodge and/or capture dirt and debris from shoes and the like.

SUMMARY

Herein is disclosed a bonded mat comprising a coil web that is bonded to a backing. The coil web comprises continuous coiled fibers, at least some of which contain expanded polymeric microspheres. The backing comprises a porous material. Methods of making the coil web and the backing, and methods of bonding the coil web and the backing, are disclosed.

Thus in one aspect, herein is disclosed a bonded mat comprising: a coil web comprising first and second major oppositely-facing major surfaces, the coil web being comprised of thermoplastic polymeric fibers with major radial surfaces, at least some of the thermoplastic polymeric fibers being porous thermoplastic polymeric fibers each comprising expanded polymeric microspheres distributed throughout the fiber and arranged such that the major radial surface of the porous thermoplastic polymeric fiber is bumpy; and, a porous thermoplastic polymeric backing comprising first and second oppositely-facing major surfaces, wherein the first major surface of the coil web is bonded to the first major surface of the porous thermoplastic polymeric backing.

In another aspect, herein is disclosed a method for making a bonded mat, comprising: extruding a thermoplastic polymer melt to form a coil web comprised of extruded fibers, wherein the polymer melt comprises expandable polymeric microspheres that expand during the extrusion process so as to render the extruded fibers porous and to provide the extruded fibers with a bumpy major radial surface; forming a thermoplastic polymeric backing precursor comprising a blowing agent; bonding a first major surface of the coil web to a first major surface of the thermoplastic polymeric backing precursor; and, activating the blowing agent and consolidating the thermoplastic polymeric backing precursor, so as to transform the thermoplastic polymeric backing precursor into a porous thermoplastic polymeric backing.

These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

Figure 1:
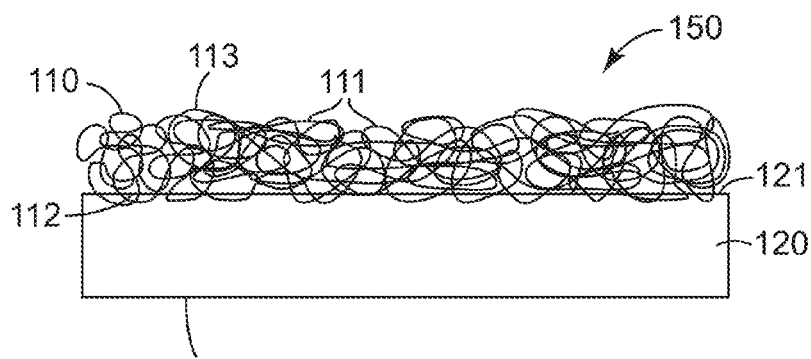
FIG. 1 is a side view of an exemplary laminate comprising an exemplary coil web that is bonded to an exemplary porous backing.

Shown in FIG. 1 is a side perspective view of an exemplary bonded mat 150 comprising coil web 110. Coil web 110 comprises porous fibers 111, and comprises first major surface 112 and second, oppositely-facing major surface 113. (Those of ordinary skill in the art will recognize that surfaces 112 and 113 of coil web 110 may not be perfectly planar and/or continuous physical surfaces since they are collectively defined by outwardmost portions of certain fibers 111 of coil web 110).

Bonded mat 150 further comprises porous backing 120, which comprises first major surface 121 and second, oppositely-facing major surface 122. First major surface 112 of coil web 110 is bonded to first major surface 121 of porous backing 120; i.e., at least some portions of some fibers 111 that comprise first major surface 112 of coil web 110 are bonded to first major surface 121 of porous backing 120. In this bonding, at least some portions of some porous fibers 111 of coil web 110 may at least partially penetrate into porous backing 120, as shown in the exemplary embodiment of FIG. 2, and be bonded thereto. The bonding of coil web 110 to porous backing 120 may be enhanced by the use of a binder, as related later herein.

At least some portions of some fibers 111 of coil web 110 comprise pores (i.e., voids) that are provided by expanded polymeric microspheres 116. At least some expanded polymeric microspheres 116 are sufficiently close to radial major surface 115 of fibers 111 to impart a bumpy characteristic to fibers 111 and surfaces 115 thereof. That is, surface 115 may comprise numerous at least slightly radially outwardly protruding bumps 117 such that porous fiber 111 comprises an undulating diameter (i.e., a diameter that varies down the long axis of the fiber).

The interior of porous backing 120 comprises voids which may be obtained e.g. by the use of a blowing agent (first and second major surfaces 121 and 122 of porous backing 120 may also display porosity resulting from the blowing agent). It should be noted that the term porous as used herein with respect to fibers 111 and/or backing 120 denotes the presence of at least numerous voids (pores) distributed throughout the interior of portions of fiber 111 or backing 120. However, the term porous does not imply that such void spaces are necessarily interconnected and/or connected to an external surface of the fiber or backing. That is, the term porosity does not require e.g. permeability of individual fibers 111 or of backing 120.

Figure 2:
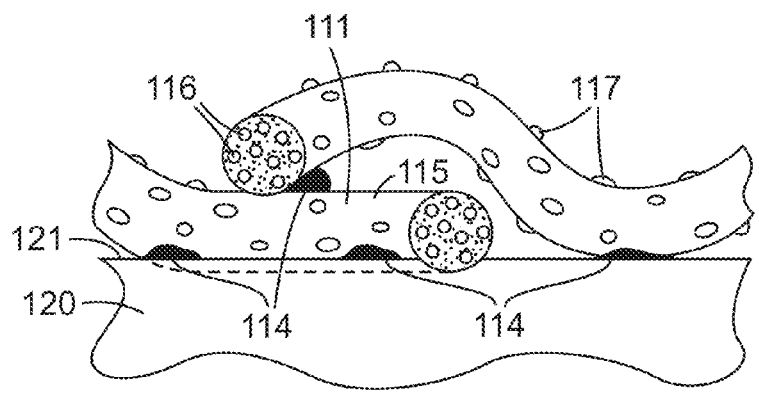
FIG. 2 is a magnified view of the exemplary coil web bonded to the exemplary porous backing, of FIG. 1.
Figure 3:
FIG. 3 is a optical micrograph at approximately 7.5 times magnification, of a portion of an exemplary coil web.

Coil web 110 comprises an open structure comprised of interengaged continuous coiled fibers 111, optionally consolidated with a consolidating binder 114. Coil web 110 may be permeable as a whole (e.g., so as to permit the passage of fluids therethrough), even though individual fibers 111 thereof may not be permeable, as explained above. Coil web 110 may be made e.g. by extruding molten polymer filaments downward into glancing contact with a contact surface of a roll (e.g., a metal roll), the contact occurring just above the surface of a quench liquid into which the filaments submerge thereafter. This may cause the filaments to fold, buckle, loop, coil, etc. as they contact the quench bath and solidify, e.g. thus resulting in a relatively thick, three-dimensional web with a highly open structure. Methods of performing such operations are described in detail e.g. in U.S. Pat. Nos. 3,686,049; 3,837,988; 4,351,683; and 4,634,485, all of which are incorporated by reference in their entirety herein. In some cases, the aforementioned folding, etc., may cause coil web 110 to have one surface that is relatively more densified than the other surface (e.g., as shown in FIGS. 2 and 3 of U.S. Pat. No. 4,351,683). In such cases, it may be preferred that the relatively more densified surface serve as first major surface 112 that is bonded to porous backing 120.

Fibers 111 of coil web 110 may be relatively large in diameter in comparison to melt-bonded fibers, spunbond fibers, and the like. In various embodiments, fibers 111 may be at least about 0.1 mm, at least about 0.2 mm, or at least about 0.3 mm, in average diameter. In further embodiments, fibers 111 may be at most about 2 mm, at most about 1.5 mm, or at most about 1 mm, in average diameter. Significant orientation of fibers 111 is typically not present, e.g. in comparison to the orientation commonly observed in spunbonded fibers and the like. The thickness of coil web 110 may be e.g. in the range of 0.3 cm to 1.6 cm.

In some embodiments, fibers 111 may be made from a polymer melt comprised of a vinyl (i.e., poly vinyl chloride) polymer resin. For example, suspension polymerized poly vinyl chloride homopolymer resins may be used. The polymer melt may comprise one or more plasticizers (e.g., dioctyl phthalate, diisobutyl phthalate, and the like). It may additionally comprise one or more additional plasticizers (e.g., epoxidized soybean oil and the like). These may be present at a lower concentration and may be termed secondary plasticizers. Other components such as mineral fillers (e.g., calcium carbonate), stabilizers (e.g., those based on calcium and/or zinc-containing materials, as are well known), pigments, processing aids, and the like, may be used.

Fibers 111 of coil web 110 comprise expanded polymeric microspheres 116, which impart voids to fibers 111 (which may advantageously provide a lower density and basis weight of fibers 111 and coil web 110). Expanded polymeric microspheres 116 may be provided by adding (e.g., mixing) the expandable polymeric microspheres to the polymer resin that is used to form the molten polymer filaments. The temperature at which the molten polymer filaments are extruded can be selected so as to motivate the expandable polymeric microspheres to expand. However, (and without wishing to be limited by theory or mechanism), it may be that, due to the high pressures present within the extruder and the extrusion die, some, most or all of the expansion may take place after the polymer melt exits the extrusion die. Thus, such expansion may take place mainly during the short time during which the molten polymer filaments traverse the distance from the extrusion die orifices to the quenching liquid (contact with the quenching liquid will of course rapidly cool the polymer melt such that no further expansion would be likely to occur). Thus, it may be useful to control the extruder and extrusion die temperatures, the flowrate of the molten polymer, the distance from the extrusion die to the quench tank, and so on, so as to promote the desired expansion of the microspheres. The temperature of the quench liquid (which is often water containing appropriate wetting agents, surfactants, etc.) may also be controlled as desired, although it may often be held at ambient temperature.

The expansion of the microspheres imparts void spaces to fibers 111, and may also impart surface 115 with slightly protruding bumps 117 as described earlier herein. Such features may provide advantageous and unexpected benefits, as discussed later herein. In various embodiments, protruding bumps 117 may comprise a radius of curvature ranging from about 0.02 mm to about 0.1 mm.

Suitable expandable polymeric microspheres may include those materials described e.g. in U.S. Patent Application Publication 2007/0208093, which is incorporated by reference herein for this purpose. Suitable expandable polymeric microspheres include e.g. those materials obtainable under the trade designation Expancel from Akzo Nobel, Amsterdam, Netherlands. Such microspheres often comprise a thermoplastic polymer shell encapsulating a propellant that can be volatilized at a temperature in the same or similar range as that at which the thermoplastic polymer shell softens. The increase in internal pressure from volatilization of the propellant may result in the microsphere expanding up to forty times its original volume so as to provide an empty (except for any residual propellant) void volume. Such expandable microspheres may be selected with an activation temperature and/or an original (unexpanded) diameter, as desired for a particular need. In various embodiments, the expandable microspheres may be may be added to the extrudable polymer resin, at any convenient loading desired, so as to be distributed throughout the extruded fibers formed therefrom, as opposed to being coating onto the outside surface of the extruded fiber. In various embodiments, the loading may range from at least about 0.1, at least about 0.2, or at least about 0.5 wt. %. In further embodiments, the loading may range from at most about 5.0, at most about 3.0, or at most about 2.0, wt. %.

In various embodiments, the expanded microspheres may be at most 0.4, 0.3, or 0.2 mm in average size (with size meaning the diameter of generally spherical expanded microspheres/voids or the equivalent diameter in the case of asymmetric microspheres/voids). In further embodiments, the expanded microspheres/voids in the fibers may be at least 0.02, 0.03, or 0.04 mm in average size. In various embodiments, the expanded polymeric microspheres may comprise an expanded diameter ranging on average from about 10% to about 50% of the diameter of the thermoplastic polymeric porous fibers 111 of coil web 110.

In various embodiments, the density of porous fiber 111 comprising expanded polymeric microspheres may be no more than about 80%, no more than about 70%, or no more than about 60%, of the density of the material that comprises fiber 111, in the absence of expanded microspheres. In specific embodiments, the density of the fiber material in the absence of expanded microspheres may be in the range of about 1.2 to about 1.6 grams per cubic centimeter, and the material comprising expanded polymeric microspheres may comprise a density in the range of about 0.6 to about 1.0 grams per cubic centimeter.

Fibers 111 of coil web 110 are bonded to each other at least at some points at which individual fibers 111 contact each other and/or are in close proximity to each other. Such bonding may occur by direct bonding, e.g. by melt-bonding of the material of one fiber to that of another fiber. However, consolidating binder 114 may also be present, and may additionally and/or primarily serve to bond fibers 111 to each other and/or to first major surface 121 of porous backing 120, as shown in FIG. 2.

Porous backing 120 is typically in the form of a sheet with length and width substantially greater than its thickness. Porous backing 120 is comprised of a thermoplastic resin that is capable of being bonded to coil web 110. In some embodiments, porous backing 120 is comprised of a plasticized vinyl (i.e., poly vinyl chloride) polymer. In such case, porous backing 120 can be made from a plastisol (liquid) which comprises poly vinyl chloride particles dispersed within a liquid plasticizer in which the poly vinyl chloride is insoluble at low temperatures, but is soluble at high temperatures. The plastisol may be deposited onto a surface (after which the plastisol may be referred to herein as a backing precursor) and exposed to a temperature sufficient to cause the plasticizer to solubilize into the poly vinyl chloride particles to sufficient extent to solidify the backing precursor into a self-supporting backing (this process, referred to as consolidation, is well known to those of ordinary skill in the art). In such embodiments, the plastisol may comprise a mixture of an emulsion-polymerized poly vinyl chloride resin, a primary plasticizer (e.g., dioctyl phthalate, diisobutyl phthalate, and the like), a secondary plasticizer (e.g., epoxidized soybean oil), a thermal stabilizer (e.g., a Ca and/or Zn containing material), processing aids and the like.

To impart porosity, the plastisol may e.g. contain a blowing agent (e.g., azodicarbonamide and the like). Particularly suitable blowing agents may include e.g. the material obtained under the trade designation Naftofoam BA-210 (a mixture of azodicarbonamide and sodium bicarbonate), from Chemson Group, Rio Claro Brazil. Upon exposure to a sufficiently high temperature, the blowing agent will be activated so as to generate a volatile component (e.g., a gas) that will expand so as to form numerous small-scale voids (i.e., pores). This process is often referred to as foaming.

If desired, the plastisol may contain an adjuvant that serves to lower the temperature needed for the blowing agent to be activated (such adjuvants are often referred to as "kickers"). Suitable adjuvants may include e.g. the well known potassium and/or zinc-containing kickers. Particularly suitable kickers may include e.g. the material obtained under the trade designation Baerostab KK3712 from Baerlocher GmbH, Unterschleissheim, Germany.

In other embodiments, porosity may be imparted to the backing by the use of expandable polymeric microspheres as described herein, by the use of glass bubble fillers, and the like.

The components of the plastisol may be mixed together by methods well known to those of ordinary skill in the art. For example, planetary mixers and the like can be used. Again as is well known, two-stage mixing may be used in which a portion of the plasticizer(s) is added in the initial mixing stage, with the remainder of the plasticizer(s) being added in a final let-down stage. This procedure may increase the shear work that is performed in the initial stages of mixing and may improve the efficiency of mixing. Applicant has further found that, in particular, it is advantageous to provide that the blowing agent and the adjuvant are very well mixed with each other and are uniformly dispersed within the plastisol mixture. This can be achieved e.g. by particular variations of the two-stage mixing procedures, as is disclosed in the Examples herein.

To form the porous backing, the plastisol may be deposited at a desired thickness, by knife coating, roll coating, slot coating, and the like, onto a moving belt, which may be an endless, reusable belt, or a disposable liner (e.g., a siliconized paper liner or the like). Often, it is convenient to perform the deposition with the plastisol at ambient temperature (which may encompass a range of, e.g., 15° C. to 30° C., depending on the surroundings). The deposited plastisol (backing precursor) may then be exposed to a first elevated temperature that is higher than the temperature of the plastisol as deposited, and that may serve to at least partially solidify the plastisol and/or may serve to at least partially activate at least a portion of the blowing agent. This may be performed by transporting the backing precursor on the moving belt so that it traverses across a heated surface (e.g., such that the lower surface of the moving belt contacts the heated surface so that heat is conducted therethrough so as to heat the backing precursor). The temperature of the heated surface, the speed of moving the belt, etc., can be chosen so as to achieve the desired temperature exposure.

It may be desired that the temperature (and/or duration of exposure thereto) experienced by the backing precursor as it passes over the heated surface be sufficiently low that the blowing agent is not completely activated during the exposure to the first elevated temperature. In such case the first elevated temperature exposure may only be sufficient to activate the blowing agent to a moderate extent, to a small extent, or to an insignificant extent. In such case, the blowing agent may be more fully (e.g., completely) activated by a finishing thermal treatment (e.g., in a finishing oven) to form porous backing 120, as described later herein. Likewise, the passage across the heated surface may be sufficient only to partially solidify (fuse) the plastisol into a self-supporting backing, with the full solidification occurring later in a finishing thermal treatment.

In various embodiments, the density of porous backing 120 as made by the use of blowing agents as described herein may be no more than about 70%, no more than about 60%, or no more than about 50%, of the density of the material that comprises backing 120, but made without use of blowing agent. In specific embodiments, the density of the backing material in the absence of blowing agents may be in the range of about 1.2 to about 1.6 grams per cubic centimeter, and the backing material made with blowing agents as disclosed herein may comprise a density in the range of about 0.5 to about 0.9 grams per cubic centimeter. In various embodiments, the voids in the porous backing may be at most 0.4, 0.3, or 0.2 mm in average size. In further embodiments, the voids in the porous backing may be at least 0.01, 0.02, or 0.04 mm in average size.

Typically, backing 120 (although porous upon activation of the blowing agent as described herein) is not permeable to liquids, and comprises a continuous structure throughout its length and width (e.g., rather than being a discontinuous structure having through-holes or the like). This property may aid in capturing any debris that is dislodged by fibers 111 and that falls into coil web 110, when bonded mat 150 is e.g. placed (backing side down) on a floor. Typically, porous backing 120 is flexible, e.g. such that bonded mat 150 can be rolled up if desired.

In describing the bonding of coil web 110 to backing 120, the term backing precursor 126 will be used, but those of ordinary skill in the art will appreciate that, there being no definitive dividing line as to when backing precursor 126 becomes backing 120, the term backing 120 may also be applicable. This bonding may be performed e.g. by placing first major surface 112 of coil web 110 in contact with first major surface 121 of backing precursor 126, at a time when backing precursor 126 is in a relatively soft condition such that at least some portions of some of the fibers 111 are able to penetrate at least partially into backing precursor 126. Coil web 110 and backing precursor 126 may then be maintained in this configuration for a short interval of time so as to allow this partial penetration, after which coil web 110 and backing precursor 126 are exposed to an elevated temperature sufficient to consolidate backing precursor 126 into (self-supporting) backing 120 with coil web 110 bonded thereto. Accomplishing these tasks may be conveniently done e.g. by producing coil web 110 as described earlier herein, then bringing surface 112 of coil web 110 into contact with surface 121 of backing precursor 126, as backing precursor 126 (carried by the moving belt) nears the completion of its passage across the earlier-described heated surface held at a first elevated temperature. Then, backing precursor 126 with coil web 110 thereupon, can traverse a distance designed to allow the desired time interval for penetration of fibers 111 of coil web 110 into backing precursor 126. After this, backing precursor 126 with coil web 110 thereupon can enter a finishing oven (which is held at a second elevated temperature which is higher than the first elevated temperature of the aforementioned heated surface) which heats backing precursor 126 sufficiently to consolidate it to form backing 120 with coil web 110 attached thereto.

To enhance the bonding of coil web 110 to backing 120, and/or to enhance the bonding of fibers 111 of coil web 110 to each other, a binder may be used. In some embodiments, the binder is a consolidating binder, e.g. a liquid vinyl plastisol that comprises sufficiently low viscosity that, upon being deposited onto (upper) major surface 113 of coil web 110, the plastisol penetrates into the interior of coil web 110. In so doing, binder 114 may accumulate at contact points and/or points of adjacency between individual fibers 111 of coil web 110, as shown in exemplary illustration in FIG. 2. When coil web 110 is brought into contact with backing 120, binder 114 may also accumulate at contact points and/or points of adjacency between some portions of some fibers 111 and some areas of major surface 121 of backing 120, again as shown in exemplary illustration in FIG. 2. Consolidation of binder 114 will then assist in the binding of fibers 111 to each other and/or to backing 120.

It may be convenient, for example, to deposit binder 114 on coil web 110 after coil web 110 has passed through a drying unit (that serves to remove any residual quench liquid) and before coil web 110 is brought into contact with backing 120. This deposition may be performed by any well-known method.

Suitable liquid plastisol consolidating binder may be a mixture comprising e.g. an emulsion-polymerized PVC resin, a primary plasticizer (e.g., dioctyl phthalate, diisobutyl phthalate, and the like), a secondary plasticizer (e.g., epoxidized soybean oil), a thermal stabilizer (e.g., a Ca and/or Zn containing material), a UV absorber, an antioxidant, a processing aid and the like.

Upon sufficient temperature exposure (e.g., as achieved in the finishing oven at the second elevated temperature), the plastisol comprising backing precursor 126, and the plastisol comprising the consolidating binder, will consolidate (which those of ordinary skill in the art will recognize as meaning that upon being removed from the elevated temperature the plastisol materials will have been transformed into generally solid materials). This will serve to provide backing 120 as a self-supporting (although flexible) sheet, and (by virtue of consolidated binder at points of contact and/or adjacency of fibers 111 with each other and/or with surface 121 of backing 120) will serve to bond fibers 111 together and to bond coil web 110 to backing 120.

As mentioned, in some embodiments the elevated temperature exposures may be performed in multiple steps, which may provide advantages as detailed herein. For example, this two step temperature exposure may provide that the first elevated temperature serves to solidify the plastisol sufficiently that coil web 110 does not penetrate unacceptably far thereinto, while still allowing sufficient penetration for enhanced bonding. This two step temperature exposure may also provide that the first elevated temperature activates blowing of the blowing agent sufficiently that the backing precursor 126 is sufficiently thick to permit satisfactory penetration of fibers 111 of coil web 110 thereinto, while not fully activating blowing of the blowing agent (which might unacceptably interfere with the penetration of fibers 111 into backing precursor 126). Once the desired amount of penetration is achieved, full activation of the blowing agent, and full consolidation of backing precursor 126 into backing 120, can be achieved by use of the finishing oven, held at the second (higher) elevated temperature. However achieved, the temperature exposure may serve to activate the blowing agent of the backing precursor so as to provide numerous voids in the backing, with a commensurate decrease in the density of the backing and a commensurate increase in the overall thickness of the backing. Thus, a porous backing may be used which is the same thickness as a dense (nonporous) backing, but which uses significantly less material.

Figure 4:
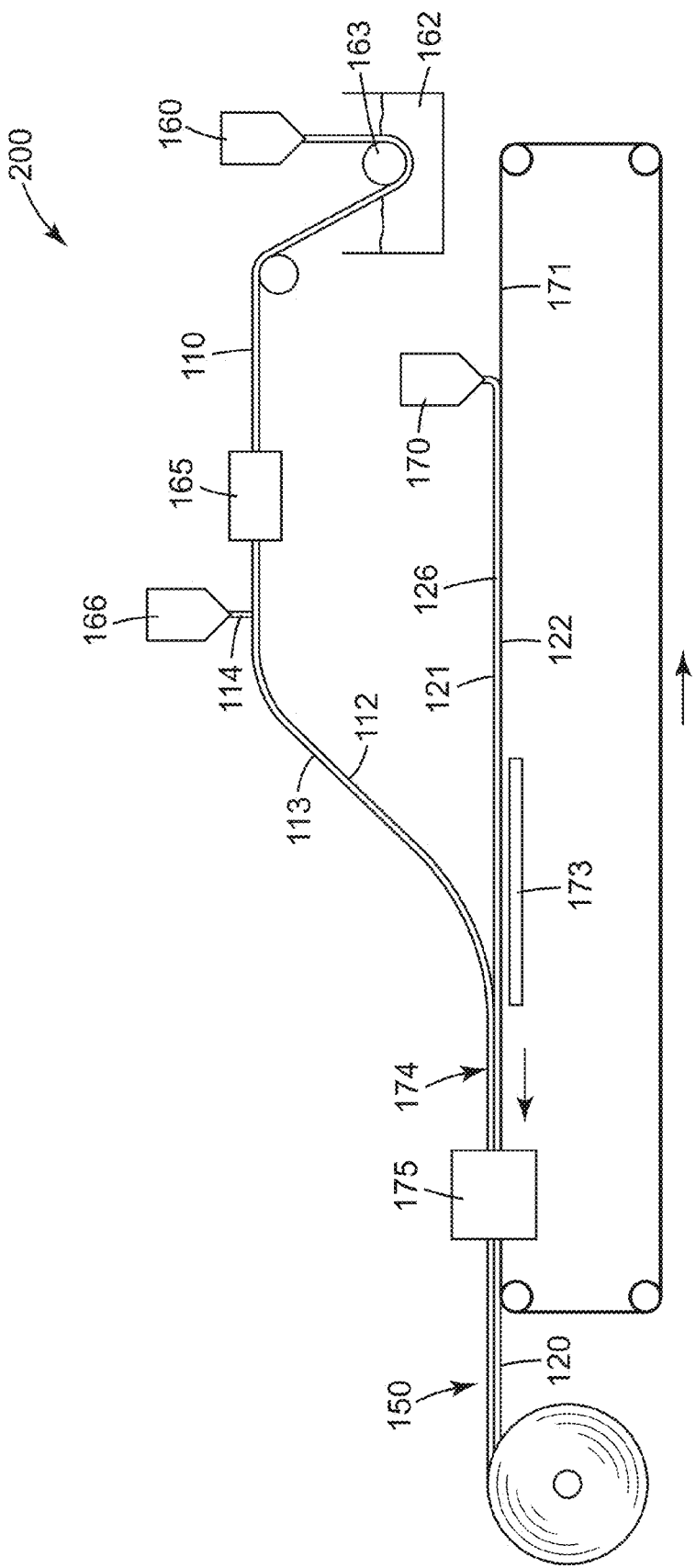
FIG. 4 is an illustrative depiction of an exemplary process for producing a bonded mat as described herein.

FIG. 4 depicts an exemplary process for making a bonded mat as disclosed herein. The process uses apparatus 200 which comprises extruder 160 which is used to extrude molten polymer filaments into quench tank 162 and into contact with a quenching liquid and roll 163 so as to form coil web 110 as described earlier herein. Coil web 110 is then passed through drying unit 165 and then through binder coating unit 166. Apparatus 200 further comprises plastisol deposition unit 170 which deposits a plastisol upon moving endless belt 171 so as to form backing precursor 126. Belt 171 with backing precursor 126 thereupon then passes across heated surface 173 which is held at a first elevated temperature. This increases the temperature of backing precursor 126 sufficiently to cause partial consolidation of backing precursor 126 and to partially activate (i.e., activate a portion of) the blowing agent contained therein. At a location near the downweb edge of heated surface 173, coil web 110 with (as yet unconsolidated) binder 114 therein is brought into contact with (partially consolidated and partially foamed) backing precursor 126. (If coil web 110 is formed so as to comprise a relatively more densified layer on the surface of coil web 110 that contacted roll 163 in the quench tank, it may be desirable to configure process line 200 so that this more densified surface of coil web 110 becomes surface 112 that is bonded to porous backing 120).

As coil web 110 and backing precursor 126 then traverse zone 174, at least some portions of at least some fibers 111 of surface 112 of coil web 110 penetrate at least partially into surface 121 of backing precursor 126. Coil web 110 and backing precursor 126 then enter finishing oven 175 which is held at a second elevated temperature which is higher than the first elevated temperature and which serves to fully consolidate backing precursor 126 into backing 120 and to fully consolidate binder 114, which combine to securely bond coil web 110 and backing 120 together to form bonded mat 150. The second elevated temperature also serves to fully activate the blowing agent within backing 120, causing numerous voids to be formed within backing 120 as described previously herein. Thus, when bonded mat 150 exits finishing oven 175, porous backing 120 may be as much as twice, three times, four times, or more, as thick as the thickness of the initially-deposited backing precursor 126. (Those of ordinary skill in the art will recognize that even though backing precursor 126 is described herein as generally being transformed into backing 120 during its passage through finishing oven 175, backing precursor 126 is typically partially consolidated during its exposure to the first elevated temperature imparted by heated surface 173, so that it may not be possible to state with certainty exactly when backing precursor 126 becomes backing 120). Upon exiting oven 175, bonded mat 150 can be separated from endless belt 171, optionally cooled (e.g., by impinging of room temperature air or refrigerated air upon bonded mat 150), and, if desired, rolled up as shown in FIG. 4. Alternatively, bonded mat 150 can be separated (e.g., cut in the crossweb direction) to form discrete articles that can be stacked, stored, etc. Various post-processing operations (e.g., printing, packaging, and so on) can be performed if desired.

As mentioned throughout this disclosure, control of the temperatures of the above-described processes may be chosen and controlled so as to achieve the advantageous effects documented herein. Such operating temperatures may be chosen based e.g. on the processing temperature of various components (e.g., the extrusion temperature of the material used to make the coil web fibers; the consolidation temperature of the backing material and the consolidating binder; the activation temperature of the expandable microspheres; and, the activation temperature of the blowing agent). In exemplary embodiments, the polymer resin used to make the coil web fibers may be vinyl (e.g., poly vinyl chloride), which may be extruded at suitable temperatures e.g. of about 200° C. The backing material and consolidating binder may be vinyl plastisols, e.g. with suitable consolidation temperatures in the range of about 110-160° C. The expandable microspheres may be chosen so as to have, e.g., an expansion-starting temperature in the range of about 120-130° C. and a maximum-expansion temperature in the range of 190-200° C. The blowing agent may be chosen so as to have, e.g., an activation temperature of about 180° C. (e.g., in the presence of a kicker). With this exemplary combination of components, it may be suitable to perform the extrusion with an extruder 160 with die temperature in the range of 180-210° C. (so as to fully expand the microspheres in the extrusion process). It may be suitable to use a heated surface 173 held at a temperature in the range of e.g. 130-160° C. (e.g., so as to consolidate backing precursor 126 to a partial extent and to activate the blowing agent therein to a partial extent). It may be suitable to perform the final bonding in a finishing oven 175 at a temperature in the range of 180° C., so as to more fully (e.g., substantially completely) consolidate backing 120 and binder 114, and to more fully (e.g., substantially completely) activate the blowing agent. Those of ordinary skill in the art will appreciate that the above are only general ranges, and will additionally recognize that the time durations of the various temperature exposures may be selected and controlled so as to achieve the advantageous results described herein.

In addition to the advantages described earlier herein, the inventor has discovered that the compositions and methods disclosed herein possess unexpected advantages. That is, the bumpy surface 115 exhibited by fibers 111 has been found to allow ink to more durably bond to surface 115 of fibers 111 (e.g., in the printing of images and the like onto coil web 110). This result is surprising in that while e.g. a porous surface of the type containing open voids into which ink may penetrate, might be expected to be a more ink receptive surface, the closed-cell nature of the voids provided by the expanded polymeric microspheres does not provide a porous, penetrable surface (as demonstrated by the photograph of FIG. 3).

Additionally, it has been found that the presence of voids imparted by expanded polymeric microspheres in fibers 111 renders coil web 110 better able to withstand high temperatures that are experienced in the course of producing composite mats (i.e., mats comprising multiple pieces that have been produced separately and are then bonded to each other edgewise). Such composite mats are often made so as to allow production of personalized mats, e.g. mats displaying letters, images, and the like.

Such composite mats may be assembled e.g. by producing two bonded mats as described above, e.g. in two different colors, and cutting through-holes completely through the first bonded mat (e.g., in the shape of letters) and cutting matching letters from the second bonded mat. The letters of the second bonded mat can then be inserted into the corresponding through-cut openings in the first bonded mat to form a composite mat. The composite mat can then be e.g. placed (backing side down) on a heated surface which can heat the backings of both bonded mats sufficiently that the edges of the backing of the second bonded mat, and the edges of the backing of the first bonded mat against which the edges of the backing of the second bonded mat are abutted, are bonded together. An ongoing problem with the industry has been that this process requires temperatures (e.g., 170-190° C.) that are sufficiently high to damage or even melt the coil web. In addition, the assembly of such composite mats is typically performed manually. Thus, the ability of a coil web to tolerate higher temperatures (which allows for more rapid bonding of the backings together) without being damaged or melting, can enable more rapid assembly of composite mats with commensurate higher productivity. It has been unexpectedly found that the use of a coil web comprising porous fibers, achieved by the presence of expanded polymeric microspheres as described herein, in combination with a porous backing as described herein, can allow the coil web to more robustly survive higher temperatures and/or longer high temperature exposures, in the assembly of composite mats.

As mentioned, bonded mat 150 may be further decorated by printing (letters, images, etc.) upon surface 113 of coil web 110. Such printing may be performed either before or after the herein-described bonding processes, as desired.

Bonded mats as disclosed herein may be used e.g. a floormats and the like. Other uses may be possible as will be readily apparent to those of ordinary skill in the art.

EXAMPLES

A bonded mat was made using apparatus and process of the type shown in FIG. 4.

Coil Web

A coil web material was made using apparatus and methods generally similar to those described in U.S. Pat. Nos. 3,686,049 and 3,837,988.

An extrudable mixture of the following approximate composition was obtained:

| Component | Function | Wt. % of total |
|---|---|---|
| Suspension Homo-polymer PVC Resin | Polymer | 44 |
| Diisobutyl Phthalate | Plasticizer | 16 |
| Epoxidized Soybean Oil | Secondary Plasticizer | 11 |
| Ca/Zn Stabilizer | Thermal Stabilizer | 0.4 |
| Calcium Carbonate | Mineral Filler | 26.7 |
| Expandable Polymer Microspheres[1] | Expandable Filler | 1.0 |
| Pigment | Coloration | 1.0% |

[1]Expancel 093DU120, Akzo Nobel

An extruder was provided comprising a die with orifices through which polymer melt could be extruded vertically downward so as to make glancing contact with a contact surface of a metal roll in a quench tank, in similar manner to that described in U.S. Pat. No. 3,837,988. The extrudable mixture was fed into the extruder, which was operated at feed zone and compression zone temperature of approximately 155° C., a melting zone temperature of approximately 160° C., and a die temperature of approximately 200° C. The die orifices were approximately 0.47 mm in diameter and were positioned a distance of approximately 38 cm above the surface of quench liquid in a quench tank. The quench liquid was held at approximately 35° C. and contained water with surfactants.

The extrudable mixture was extruded at an extrusion rate of approximately 4 kg/minute through the die orifices. The extruded fibers passed into the quench liquid, in the process making glancing contact with the metal roll, so as to form a coil web of thickness approximately 1.2 cm, comprised of fibers with average diameter in the range of approximately 0.6 mm. In the manner shown in FIG. 4, the coil web was removed from the quench tank and passed through a drying unit. The speed of the coil web was approximately 2.5 meters per minute.

Consolidating Binder

A low viscosity, consolidating binder (a plastisol) was obtained of the following approximate composition:

| Component | Function | Wt. % of total |
| --- | --- | --- |
| Emulsion PVC Resin | Polymer | 44.8 |
| Dioctyl Phthalate | Plasticizer | 51.7 |
| Epoxidized Soybean Oil | Secondary Plasticizer | 2.3 |
| Ca/Zn Stabilizer | Thermal Stabilizer | 0.8 |
| 2-hydroxybenzophenone | UV Absorber | 0.3 |
| Octadecyl 3,5-Di-(tert)-butyl-4-hydroxyhydrocinnamate | Antioxidant | 0.1 |

The binder plastisol was deposited onto the dried coil web by a coating unit located downweb of the coil web drying unit. The binder plastisol coating unit comprised two metal rolls (with their long axis oriented crossweb to the coil web), with the binder plastisol being metered into the gap between two metal rolls. The metal rolls acted to spread the plastisol generally uniformly across the width of the coil web as the coil web passed under the metal rolls.

Backing

A plastisol was produced of the following approximate composition:

| Component | Function | Wt. % of total |
| --- | --- | --- |
| Emulsion PVC Resin | Polymer | 31 |
| Dioctyl Phthalate | Plasticizer | 32 |
| Epoxidized Soybean Oil | Secondary Plasticizer | 2.4 |
| Ca/Zn | Thermal Stabilizer | 1.0 |
| Calcium carbonate | Mineral Filler | 30 |
| Azodicarbonamide[1] | Blowing Agent | 1.4 |
| K/Zn Kicker | Blowing Agent Adjuvant | 2.3 |

[1]Naftofoam BA-210, obtained from Chemson Group

A variation of the two-step mixing procedure described earlier herein was used, so as to obtain uniform dispersal of the blowing agent within the plastisol and excellent mixing of the blowing agent with the blowing agent adjuvant. In this procedure, a portion of the dioctyl phthalate plasticizer, and all of the azo blowing agent, were placed into a planetary rotary mixer and mixed for approximately 15 minutes. After that, the kicker, thermal stabilizer and secondary plasticizer were added and mixing was continued for approximately 5 more minutes. After that, the remaining portion of the dioctyl phthalate, and the emulsion PVC resin, were added and mixing was continued for approximately 5 more minutes. After that, the calcium carbonate filler was added and mixing was continued for approximately 10 more minutes. No heat was applied during mixing, but it was observed that the composition did heat up slightly due to the mixing process.

The plastisol composition (i.e., backing precursor) was deposited by knife coating onto the surface of an endless polymeric belt that comprised a surface which allowed easy release of fused PVC plastisol. The backing precursor was knife coated at a nominal thickness of approximately 1 mm. The endless belt with the backing precursor thereon then continued horizontally (at a speed of approximately 2.5 meters per minute) so as to pass over a heated metal surface (with the bottom surface of the endless belt contacting the heated metal surface). The surface was held at 150° C. The heated surface was approximately 1.5 meters long (in the downweb direction of the endless belt).

At a position within a few centimeters of the downweb end of the heated surface, the coil web was brought down atop the backing precursor in the general manner depicted in FIG. 4. The endless belt with the backing precursor and coil web atop then continued a distance of approximately 2 meters (during which some of the fibers of the coil web penetrated partially into the backing precursor) and then entered a finishing oven which was held at approximately 180° C. The residence time within the oven was in the range of approximately 4 minutes. Upon exiting the oven, the bonded mat comprised a porous backing of thickness approximately 3 mm, with a coil web bonded securely thereto. The bonded mat was then removed from the endless belt, was cooled by way of refrigerated air directed thereonto, waste edges were slit and removed as necessary (to provide a bonded mat with a final width of approximately 1.2 meters), and the bonded mat was rolled up.

In typical samples made as described above, the density of the backing was approximately 0.6 grams per cubic centimeter. In comparison, samples of similar composition except without blowing agents, typically comprised a density in the range of approximately 1.3 grams per cubic centimeter.

In typical samples made as described above, the density of the coil web fiber material was approximately 0.8 grams per cubic centimeter. In comparison, samples of similar composition except without expanded polymeric microspheres, which typically comprised a density in the range of approximately 1.5 grams per cubic centimeter.

In addition to the Example disclosed above, numerous additional experiments were run. For instance, in regard to the making of the coil web, various compositions of extrudable resin were used, including in particular different levels of expandable polymeric microspheres. Various extrusion temperatures were used, and various distances between the extrusion die and the quench bath were examined. The specific conditions reported in the Example herein proved to be suitable in the particular circumstances therein; however, those of skill in the art will appreciate that conditions may be varied as circumstances warrant. Similarly, various compositions of plastisol, and various processing conditions, were used to make the backing. Again similarly, various temperatures of the heated surface and of the finishing oven were used. Thus, although only one working example is reported herein, it should be understood that many such working examples were performed, in order to more fully understand the suitable ranges of the discoveries reported herein. Thus, the ranges and optimum conditions reported herein represent the distilled product of that extensive experimentation.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. A bonded mat comprising:
   a coil web comprising first and second oppositely-facing major surfaces,
     the coil web being comprised of thermoplastic polymeric fibers each with a major radial surface, at least some of the thermoplastic polymeric fibers being porous thermoplastic polymeric fibers each comprising expanded polymeric microspheres distributed throughout the fiber and arranged such that the major radial surface of the porous thermoplastic polymeric fiber is bumpy;
   and,
   a porous thermoplastic polymeric backing comprising first and second oppositely-facing major surfaces,
     wherein the first major surface of the coil web is bonded to the first major surface of the porous thermoplastic polymeric backing; and,
     wherein the expanded polymeric microspheres comprise an expansion-starting temperature, and wherein the porous thermoplastic polymeric fibers are comprised of a thermoplastic material that comprises an extrusion temperature that is higher than the expansion-starting temperature of the expanded polymeric microspheres.

2. The bonded mat of claim 1 wherein the expanded polymeric microspheres are present in the porous thermoplastic polymeric fibers at a loading of from about 0.4% to about 2.0% by weight.

3. The bonded mat of claim 1 wherein the porous thermoplastic polymeric fibers comprise a density that is less than about 60% of the density of the thermoplastic polymeric material of the fibers, in the absence of pores.

4. The bonded mat of claim 1 wherein the porous thermoplastic polymeric fibers comprise a density that is less than about 1.0 grams per cubic centimeter.

5. The bonded mat of claim 1 wherein the porous thermoplastic polymeric fibers comprise an average diameter of from about 0.3 mm to about 1 mm.

6. The bonded mat of claim 1 wherein the expanded polymeric microspheres comprise an expanded diameter ranging on average from about 10% to about 50% of the diameter of the porous thermoplastic polymeric fibers of the coil web.

7. The bonded mat of claim 1 wherein the porous thermoplastic polymeric backing comprises a density that is less than about 60% of the density of the thermoplastic polymeric material of the backing in the absence of pores.

8. The bonded mat of claim 1 wherein the porous thermoplastic polymeric backing comprises a density that is less than about 0.8 grams per cubic centimeter.

9. The bonded mat of claim 1 wherein at least some portions of at least some of the porous thermoplastic polymeric fibers that comprise the first major surface of the coil web penetrate at least partially into the first major surface of the porous thermoplastic polymeric backing.

10. The bonded mat of claim 1 wherein the bonded mat comprises a binder that at least assists in bonding at least some of the porous thermoplastic polymeric fibers to each other at points of contact or points of adjacency between the fibers, and that at least assists in bonding at least some of the porous thermoplastic polymeric fibers to the first major surface of the porous thermoplastic polymeric backing at points of contact or points of adjacency between fibers and the first major surface of the backing.

11. The bonded mat of claim 10 wherein the porous thermoplastic polymeric fibers are comprised of plasticized poly vinyl chloride, wherein the porous thermoplastic polymeric backing is comprised of a foamed, consolidated poly vinyl chloride plastisol, and wherein the binder is comprised of a consolidated poly vinyl chloride plastisol.

12. The bonded mat of claim 1 wherein at least some fibers of the coil web are bonded to each other at least at some points at which the fibers contact each other.

13. The bonded mat of claim 12 where at least some of the fibers of the coil web are melt-bonded to each other.

14. The bonded mat of claim 1 wherein the porous thermoplastic polymeric backing is not permeable to liquids.

15. The bonded mat of claim 14 wherein the porous thermoplastic polymeric backing is continuous throughout its length and width and does not contain any through-holes.

* * * * *